US 6,708,984 B1

(12) United States Patent
North et al.

(10) Patent No.: US 6,708,984 B1
(45) Date of Patent: Mar. 23, 2004

(54) SEAL ASSEMBLIES

(75) Inventors: Phillip North, Horsham (GB); Stephen Ellis Ormrod, East Grinstead (GB); Christopher Mark Bailey, Horsham (GB)

(73) Assignee: The BOC Group plc, Windlesham (GB)

( * ) Notice: Subject to any disclaimer, the term of this patent is extended or adjusted under 35 U.S.C. 154(b) by 0 days.

(21) Appl. No.: 09/697,270

(22) Filed: Oct. 26, 2000

(30) Foreign Application Priority Data

Oct. 27, 1999 (GB) ............................................. 9925469

(51) Int. Cl.$^7$ ............................................. F16L 17/06
(52) U.S. Cl. ...................... 277/608; 277/616; 277/625; 277/626
(58) Field of Search ............................... 277/608, 609, 277/616, 626, 602, 625

(56) References Cited

U.S. PATENT DOCUMENTS

| 1,942,704 A | | 1/1934 | Hubbard et al. | |
|---|---|---|---|---|
| 3,167,322 A | * | 1/1965 | Aichroth | 277/453 |
| 3,425,716 A | * | 2/1969 | Blau | 277/608 |
| 3,704,021 A | | 11/1972 | Barbarin et al. | |
| 6,139,026 A | * | 10/2000 | Gruver et al. | 277/608 |
| 6,260,854 B1 | * | 7/2001 | Lemon | 277/609 |
| 6,267,414 B1 | * | 7/2001 | Mosse | 277/603 |
| 6,325,390 B1 | * | 12/2001 | Sillmon | 277/614 |

FOREIGN PATENT DOCUMENTS

| DE | 297 07 063 U 1 | 7/1997 |
|---|---|---|
| FR | 2 308 288 | 11/1976 |
| FR | 2 680 222 A1 | 2/1993 |

OTHER PUBLICATIONS

European Search Report of Application No. EP 00 30 9305 completed Nov. 25, 2002.

* cited by examiner

Primary Examiner—Anthony Knight
Assistant Examiner—E Peavey
(74) Attorney, Agent, or Firm—Ira Lee Zebrak

(57) ABSTRACT

A seal assembly comprising a main O-ring seal element for engaging in a fluid tight manner opposed surfaces of two objects to be sealingly connected together and a barrier element positioned to protect all or a substantial portion of the surface of the main O-ring seal element against contact by the fluid when passing through the seal assembly from one object to the other object.

2 Claims, 1 Drawing Sheet

SEAL ASSEMBLIES

BACKGROUND OF THE INVENTION

The present invention relates to seal assemblies. It has been found that seal assemblies when used in the exhaust systems of semiconductor manufacturing plants which employ or generate certain corrosive chemicals in the gas stream can deteriorate more rapidly than usual. This is especially true of applications with Fluorine chemistries based on the use of $ClF_3$ and/or $NF_3$. The exhaust process gases attack the main seal element of the seal assemblies which reduces the useful working life of said seal assemblies.

One method of overcoming this problem is to manufacture the main seal element from more inert but more expensive material than the usual elastomeric material.

It is an aim of the present invention to provide a seal assembly for use in a hostile environment such as the exhaust system of a semi-conductor manufacturing plant which has an extended useful service life but does not require the main seal element to be made from an expensive inert material.

In vacuum technology applications it is common practice for seal assemblies to be based on International Standards for the design of vacuum coupling components. This is to allow for interchangeability and to ensure good vacuum engineering practice is followed to produce good performance at low negative (vacuum) pressures. However in many applications for seal assemblies they must also maintain integrity at substantial positive pressures.

It is a further aim of the present invention to provide a seal assembly which meets these diverse requirements.

Another method of overcoming the problem of main seal element attack is to use a metallic or plastics seal element, protected from attack if necessary by suitable corrosion resistant coatings or an elastomeric seal element enclosed or protected by a layer of corrosion resistant material for example, metallic or plastic films or coatings. However, in all such designs, the seal is formed by the metallic or plastic layer in direct contact with the surfaces of the two objects to be sealed. The lack of elasticity of such materials together with the resultant high tightening forces (compression and/or shear) needed with such seal elements requires the use of special clamping means which are stronger, take up more space and are more expensive to manufacture and fit than clamping means suitable for elastomeric seal elements. Such metallic or plastic seal elements also require better surface finishes on the flanges of the objects to be sealed which are more expensive to manufacture and more prone to damage.

It is yet a further aim of the present invention to provide a seal assembly for use in hostile environments such as the exhaust systems of semiconductor manufacturing plants which has an extended useful life but which can be used with the same inexpensive and compact clamping components and methods already in use with elastomeric seals.

SUMMARY OF THE INVENTION

According to the present invention, a seal assembly comprises a main O-ring seal element for engaging in a fluid tight manner opposed surfaces of two objects to be sealingly connected together and a barrier element positioned to protect all or a substantial portion of the surface of the main O-ring seal element against contact by the fluid when passing through the seal assembly from one object to the other object.

Preferably, the barrier element is in the form of an O-ring having some elasticity and has an outer surface which engages the inner surface of the main O-ring seal element. The main O-ring seal element may be made from an elastomeric material for example, fluoroelastomer and the barrier element may be made from an inert material such as PTFE.

The seal assembly may include an over-pressure element which will make it suitable for use with systems having high internal pressures. Preferably, the seal assembly includes means for locating accurately the seal assembly between opposed flanges on the respective objects, and controlling the compression of both the main O-ring seal element and the barrier element.

BRIEF DESCRIPTION OF THE DRAWINGS

An embodiment of the invention will now be described by way of example, reference being made to the Figures of the accompanying diagrammatic drawings in which.

DETAILED DESCRIPTION OF THE INVENTION

Figure 1:
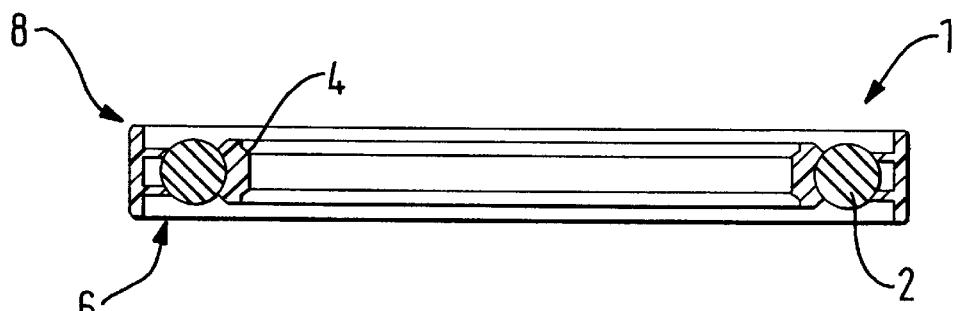
FIG. 1 is a cross-section through a seal assembly according to the present invention.

As shown, a seal assembly 1 comprises a main O-ring seal element 2 made from an elastomeric material such as fluoroelastomer and a barrier element 4 in the form of an O-ring which, as shown, has an outer surface which engages the inner surface of the main O-ring seal element 2. The barrier element 4 is made from an inert material such as PTFE. Alternatively, the barrier element 4 may be made from a composite of plastically and elastically deforming materials and rigid materials.

As shown, the main O-ring seal element 2 and the barrier element 4 are contained within an over-pressure element 6 in the form of a metal cylinder. Lips 8 are formed on the over-pressure element 6 which provide means for locating the seal assembly 1 accurately between opposed flanges 10, 12 of two objects 14, 16 for example elements of an exhaust system. The barrier element 4 ensures that the seal assembly 1 remains intact when not located between the flanges 10, 12 in that its outside diameter is slightly greater than the internal diameter of the main O-ring seal element 2.

Figure 2:
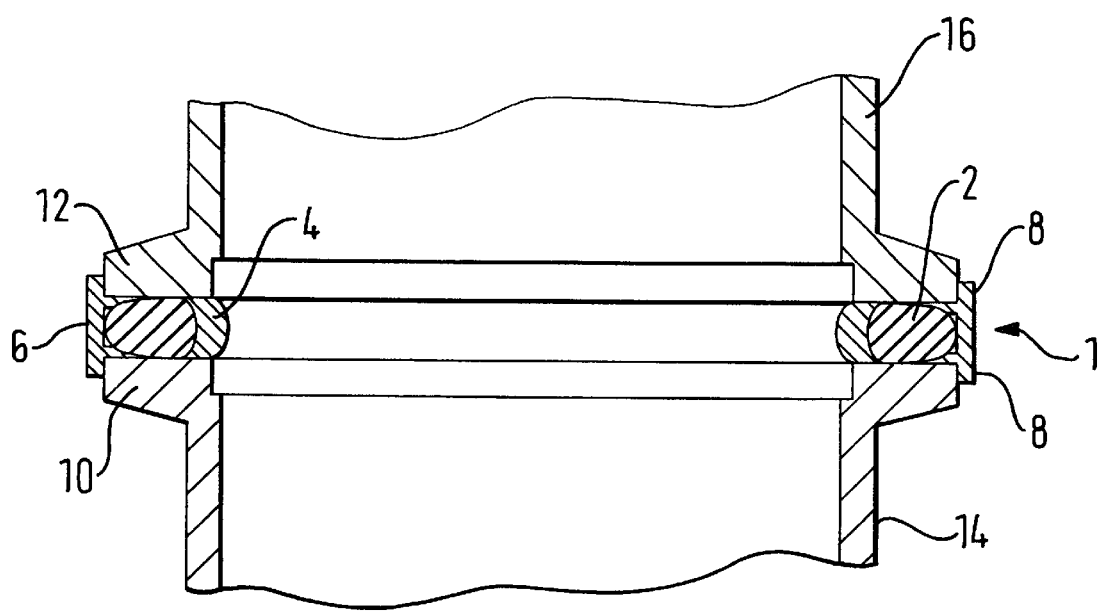
FIG. 2 is a cross-section of the seal assembly of FIG. 1 in situ between opposed flanges of two objects to be sealingly connected together.

According to the present invention when the seal assembly 1 is clamped between opposed flanges 10, 12 on elements of an exhaust system of a semi-conductor manufacturing plant as shown in FIG. 2 then the barrier element 4 will protect the main O-ring seal element 2 against contact by exhaust process gases flowing through the seal assembly 1. The barrier element 4 significantly reduces the quantity of process gases to which the main O-ring seal element 2 is exposed and the useful service-life of the seal assembly 1 is thereby increased.

The barrier element 4 has some inherent elasticity and compression force applied radially inwardly from the main O-ring seal element 2 ensures that the element 4 always provides some force against the flanges 10, 12 between which the seal assembly is clamped. The barrier element 4 is plastically deformed by the clamping force such that its sealing faces closely conform to the sealing faces of the flanges or other objects to be sealed. This deformation seal is not adequate to provide a high degree of vacuum leak tightness of hermeticity, but is sufficient to prevent the main O-ring seal element 2 from being wetted and attacked by corrosive, condensable or other degrading chemicals in the gas stream. The vacuum tight seal is provided by the elasticity of the main O-ring sealing element 2. The seal assembly 1 can be configured such that this elasticity also provides additional continual loading to support the barrier element 4 once the plastic deformation has occurred. In this way the seal can be made and re-made several times.

Further, the barrier element 4 acts as a retaining ring and prevents movement of the main O-ring seal element 2 when the sealing assembly coupling is evacuated. The over-pressure element 6 limits the compression of the main O-ring seal element 2 and the barrier element 4. It ensures that there is enough free space for the main O-ring seal element 2 to distort in that the volume of the element 2 when assembled between the flanges 10, 12 and fully clamped is the same as when the element 2 is free from compressive forces.

Further, the over-pressure element 6 prevents the main O-ring seal element 2 from blowing out when the seal assembly 1 is subjected to high internal pressure.

A benefit of this invention relates to the operation of the main seal element 2 at the elevated temperatures which are often used on exhaust systems to prevent or minimise the deposition of process by-products. Seal assemblies must be designed to accommodate the volumetric thermal expansion of the seal element which is typically substantially greater than the other components of the sealed coupling. In the above described embodiment, the relative expansion of the main O-ring seal element 2 is accommodated by and provides additional loading to, the barrier element. The additional loading compensates from any potential loss in the effectiveness of the plastic deformation seal of the barrier element 4 in the event of creep of the barrier element induced by elevated temperatures.

Another further benefit of this invention relates to the potential use of the seal assembly in high vacuum applications. Although targeted at exhaust applications, the seal assembly can be made compatible with standard coupling components and there exists the potential for misuse of the improved seal element in high vacuum applications where a non-optimised design could compromise the vacuum performance (longer pump-down times or higher ultimate pressures). Whilst this improved seal assembly can be identified by suitable markings or colour coding or other means, it is possible by careful design and choice of materials to avoid substantially compromising the vacuum performance and provide a seal assembly for exhaust applications which is also suitable for the majority of high vacuum applications.

In an alternative embodiment, the main O-ring seal element 2 and the over-pressure element 6 are initially assembled together as a single unit by fixing means such as an adhesive. The seal assembly may be constructed to be compatible with ISO standard vacuum flanges in that the over-pressure element 6 is modified to locate and centre the main O-ring seal element 2 by the location of its outer diameter against the flange clamping devices. Further, the barrier element 4 may also include features to provide radial location of the seal assembly 1 for example by location on the internal bore of the mating flanges.

We claim:

1. A seal assembly comprising a main O-ring seal element for engaging in a fluid tight manner opposed surfaces of two objects to be sealingly connected together and a barrier element having some elasticity and positioned to protect all or a substantial portion of the surface of the main O-ring seal element against contact by the fluid when passing through the seal assembly from one object to the other object wherein the main O-ring seal element and the barrier element are contained within a cylindrical over-pressure element and wherein the barrier element is deformed by the cylindrical over-pressure element and wherein the main O-ring seal element exerts a compressive force on the barrier element.

2. A seal assembly comprising a main O-ring seal element for engaging in a fluid tight manner opposed surfaces of two objects to be sealingly connected together and a barrier element made from an inert material and positioned to protect all or a substantial portion of the surface of the main O-ring seal element against contact by the fluid when passing through the seal assembly from one object to the other object wherein the main O-ring seal element and the barrier element are contained within a cylindrical over-pressure element and wherein the barrier element is deformed.

* * * * *